(12) United States Patent
Kuwayama

(10) Patent No.: US 11,472,230 B2
(45) Date of Patent: *Oct. 18, 2022

(54) PNEUMATIC TIRE

(71) Applicant: BRIDGESTONE CORPORATION, Tokyo (JP)

(72) Inventor: Isao Kuwayama, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 157 days.

This patent is subject to a terminal disclaimer.

(21) Appl. No.: 16/497,029

(22) PCT Filed: Dec. 22, 2017

(86) PCT No.: PCT/JP2017/046260
§ 371 (c)(1),
(2) Date: Sep. 24, 2019

(87) PCT Pub. No.: WO2018/179638
PCT Pub. Date: Oct. 4, 2018

(65) Prior Publication Data
US 2020/0376892 A1 Dec. 3, 2020

(30) Foreign Application Priority Data

Mar. 30, 2017 (JP) .............................. JP2017-069109

(51) Int. Cl.
B60C 9/22 (2006.01)
B60C 9/30 (2006.01)
B60C 9/20 (2006.01)

(52) U.S. Cl.
CPC .................. B60C 9/20 (2013.01); B60C 9/22 (2013.01); B60C 9/30 (2013.01);
(Continued)

(58) Field of Classification Search
CPC . B60C 9/22; B60C 9/2204; B60C 2009/2219; B60C 2009/2223;
(Continued)

(56) References Cited

U.S. PATENT DOCUMENTS 6,260,596 B1* 7/2001 Ubukata ............... B60C 9/2009
152/526
8,272,413 B2* 9/2012 Ishiyama ............ B60C 11/0302
152/209.11
(Continued)

FOREIGN PATENT DOCUMENTS

CN 102548775 A 7/2012
CN 105263726 A 1/2016
(Continued)

OTHER PUBLICATIONS

Communication dated Sep. 28, 2020 by the European Patent Office in application No. 17903441.8.
(Continued)

Primary Examiner — Justin R Fischer
(74) Attorney, Agent, or Firm — Sughrue Mion, PLLC

(57) ABSTRACT

A pneumatic tire comprising a carcass 11, at least one inclined belt layer 13 having a cord extending inclined at an angle of 30° or more relative to the tire circumferential direction, and a tread 15 arranged outward in the tire radial direction of the inclined belt layer 13, wherein a circumferential cord layer 14 arranged inward in the tire radial direction of the tread 15 has a high-rigidity region and a low-rigidity region and the high-rigidity region has a higher negative ratio in a ground contact width of the tread 15 than the low-rigidity region.

4 Claims, 3 Drawing Sheets

(52) U.S. Cl.
CPC .............. *B60C 2009/2019* (2013.01); *B60C 2009/2058* (2013.01); *B60C 2009/2271* (2013.01)

(58) Field of Classification Search
CPC .... B60C 2009/2228; B60C 2009/2266; B60C 2009/2271; B60C 9/30; B60C 11/0327; B60C 11/033; B60C 2009/2051; B60C 2009/2054; B60C 2009/2087
See application file for complete search history.

(56) References Cited

U.S. PATENT DOCUMENTS

| | | | |
|---|---|---|---|
| 2006/0266455 A1 | 11/2006 | Nagai | |
| 2010/0252163 A1* | 10/2010 | Katayama | B60C 9/2204 152/537 |
| 2012/0125508 A1 | 5/2012 | Ichihara | |
| 2014/0174624 A1* | 6/2014 | Hayes | B60C 9/20 152/527 |
| 2015/0122392 A1 | 5/2015 | Kozuki | |
| 2016/0059631 A1 | 3/2016 | Okazaki | |

FOREIGN PATENT DOCUMENTS

| | | | |
|---|---|---|---|
| EP | 2077192 | * | 7/2009 |
| JP | 03-189208 A | | 8/1991 |
| JP | 07-223407 A | | 8/1995 |
| JP | 2002-337510 A | | 11/2002 |
| JP | 2011-068247 A | | 4/2011 |
| WO | WO 01/15918 | * | 3/2001 |
| WO | 2004/052663 A1 | | 6/2004 |
| WO | 2013/161296 A1 | | 10/2013 |

OTHER PUBLICATIONS

International Preliminary Report on Patentability with a Translation of Written Opinion in International English Application No. PCT/JP2017/046260, dated Oct. 1, 2019.

Search Report dated Dec. 14, 2020 from the China National Intellectual Property Administration in Application No. 201780089308.X.

International Search Report for PCT/JP2017/046260, dated Apr. 3, 2018.

* cited by examiner

PNEUMATIC TIRE

CROSS REFERENCE TO RELATED APPLICATIONS

This application is a National Stage of International Application No. PCT/JP2017/046260 filed Dec. 22, 2017, claiming priority based on Japanese Patent Application No. 2017-069109 filed Mar. 30, 2017.

TECHNICAL FIELD

The present disclosure relates to a pneumatic tire.

BACKGROUND

Tire noise generated by rolling tires while driving a motor vehicle is considered to be an aspect of tire performance, and various improvements for improving the tire performance have been considered. One of the factors that generate tire noise is the noise emitted by vibration of the tread portion.

Additionally, in recent years, the reduction of the weight of the tire has been attempted in order to reduce the rolling resistance of the tire, but along with the reduction in weight, the vibration damping property in the rolling tire is reduced, and the noise emission emitted from the tire tends to increase.

For example, a pneumatic tire (refer to WO2013/161296 (PTL 1)) which improves the noise performance while maintaining the steering stability and the rolling resistance performance has been proposed as a means for reducing the noise emission.

CITATION LIST

Patent Literature

PTL 1: WO2013/161296

SUMMARY

Technical Problem

Under such circumstances, for example, even when the reduction of the rolling resistance of the tire was achieved by reducing the weight of the tire, a tire capable of more effectively suppressing the noise emission due to the vibration of the tread portion has been desired.

It would thus be helpful to provide a pneumatic tire in which the rolling resistance performance is maintained while suppressing the noise emission to improve the noise performance.

Solution to Problem

To obtain the aforementioned object, a pneumatic tire according to the present disclosure comprises a carcass toroidally extending between a pair of bead portions, at least one inclined belt layer arranged passing through a tire equator outward in the tire radial direction of a crown portion of the carcass, and having a cord extending inclined at an angle of 30° or more with respect to a tire circumferential direction, and a tread arranged outward in the tire radial direction of the inclined belt layer, wherein at least one circumferential cord layer having a cord extending along the tire circumferential direction is arranged inward in the tire radial direction of the tread, the circumferential cord layer having a high-rigidity region which is a region including the tire equator and in which the rigidity in the tire circumferential direction per unit width in the tire width direction is high, and a low-rigidity region which is a region on each side in the tire width direction of the high-rigidity region and in which the rigidity in the tire circumferential direction per unit width in the tire width direction is low, and the high-rigidity region has a higher negative ratio in a ground contact width of the tread than the low-rigidity region.

A pneumatic tire according to the present disclosure comprises a carcass toroidally extending between a pair of bead portions, at least one inclined belt layer arranged outward in the tire radial direction of a crown portion of the carcass and having a cord extending inclined relative to the tire circumferential direction, and a tread arranged outward in the tire radial direction of the inclined belt layer, wherein at least one circumferential cord layer having a cord extending along the tire circumferential direction is arranged inward in the tire radial direction of the tread, the inclined belt layer includes at least a wide-width inclined belt layer having a relatively wide width in the tire width direction and a narrow-width inclined belt layer having a relatively narrow width in the tire width direction, both passing through the tire equator, and when an inclination angle relative to the tire circumferential direction of the cord of the wide-width inclined belt layer is θ1 and an inclination angle relative to the tire circumferential direction of the cord of the narrow-width inclined belt layer is θ2, 30°≤θ1≤85°, 10°≤θ2≤30°, and, θ1>θ2 are satisfied, the inclined belt layer has a high-rigidity region which is a region including the tire equator and in which the rigidity in the tire circumferential direction per unit width in the tire width direction is high, and a low-rigidity region which is a region on each side in the tire width direction of the high-rigidity region and in which the rigidity in the tire circumferential direction per unit width in the tire width direction is low, and the high-rigidity region has a higher negative ratio in a ground contact width of the tread than the low-rigidity region.

In the description, the above-mentioned width in the tire width direction and the like, unless stated otherwise, shall be measured by mounting a tire on an applicable rim, filling the prescribed internal pressure, and under no load.

The "applicable rim" is an approved rim ("measuring rim" in the ETRTO Standards Manual and "design rim" in the IRA Year Book) prescribed in the following standards in accordance with a tire size, the "prescribed internal pressure" is the air pressure prescribed in the following standards corresponding to the maximum load capability, and the "maximum load capability" is the maximum mass which is allowed to be loaded on a tire by the following standards. Moreover, the standard is an effective industrial standard in areas where tires are produced or used, as described in the Japan Automobile Tyre Manufacturers Association (JATMA) Year Book in Japan, the European Tyre and Rim Technical Organisation (ETRTO) Standards Manual in Europe, or the Tire and Rim Association (TRA) Year Book in the United States.

Further, the state "extending along the ire circumferential direction" includes the case when the cord is parallel to the tire circumferential direction, and the case when the cord is somewhat inclined with respect to the tire circumferential direction (the case when the angle with respect to the tire circumferential direction is approximately 5° or less).

Furthermore, "the ground contact width of the tread" indicates the maximum width of a surface where the tire surface comes into contact with the ground in a state in which the maximum load (maximum load capability) and the air pressure corresponding to the maximum load is applied, that is, the maximum straight distance in the tread width direction of the tread surface. The "negative ratio" indicates the ratio of the area of the groove with respect to the area of the tread surface.

Advantageous Effect

The present disclosure can provide a pneumatic tire in which the rolling resistance performance is maintained while suppressing the noise emission and improving the noise performance.

BRIEF DESCRIPTION OF THE DRAWINGS

In the accompanying drawings.

DETAILED DESCRIPTION

An embodiment of the present disclosure will be described below using the drawings in accordance with need.

FIRST EMBODIMENT

Figure 1A:
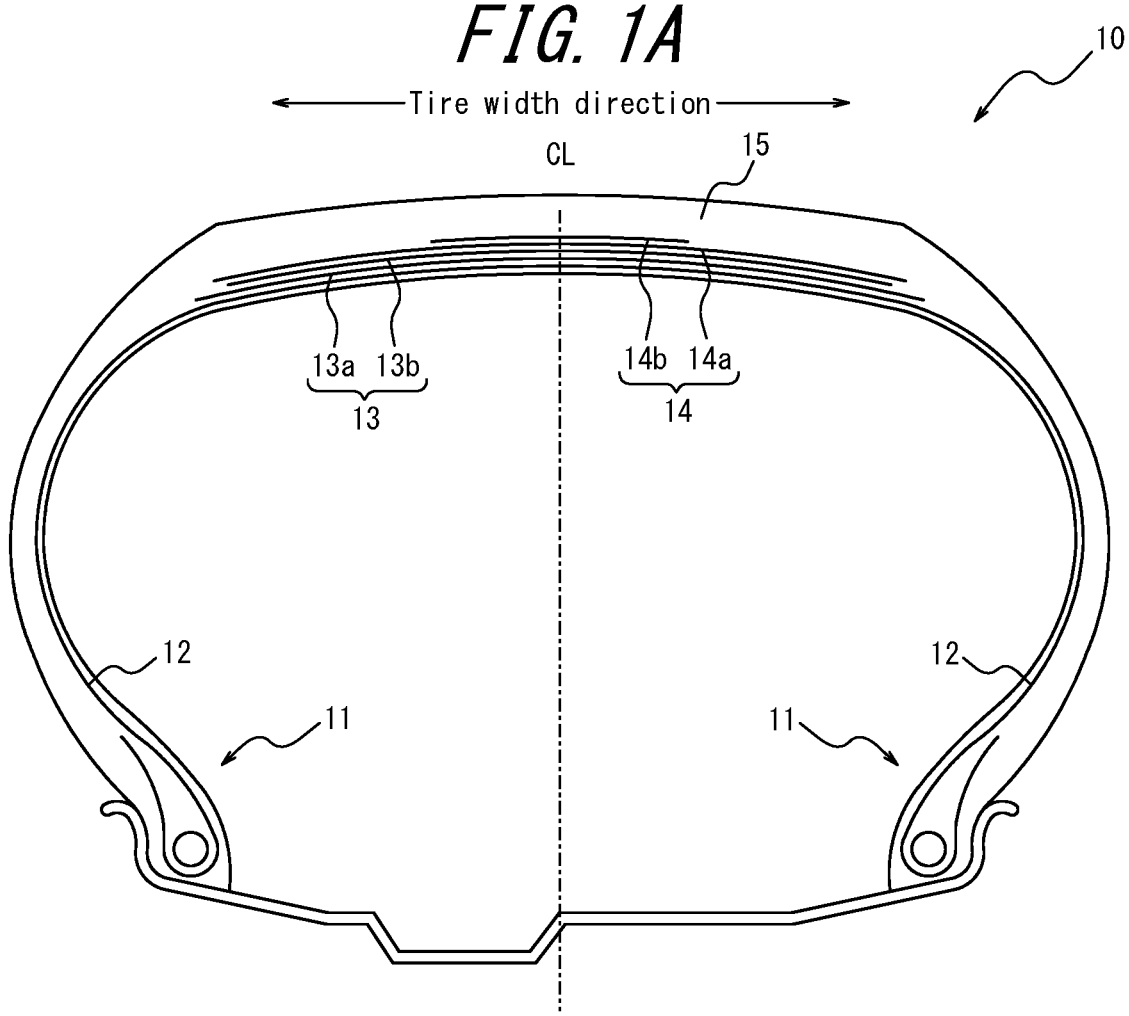
FIG. 1A is a schematic view of a pneumatic tire according to a first embodiment of the present disclosure, and is a cross-sectional view in the tire width direction of the whole tire.
Figure 1B:
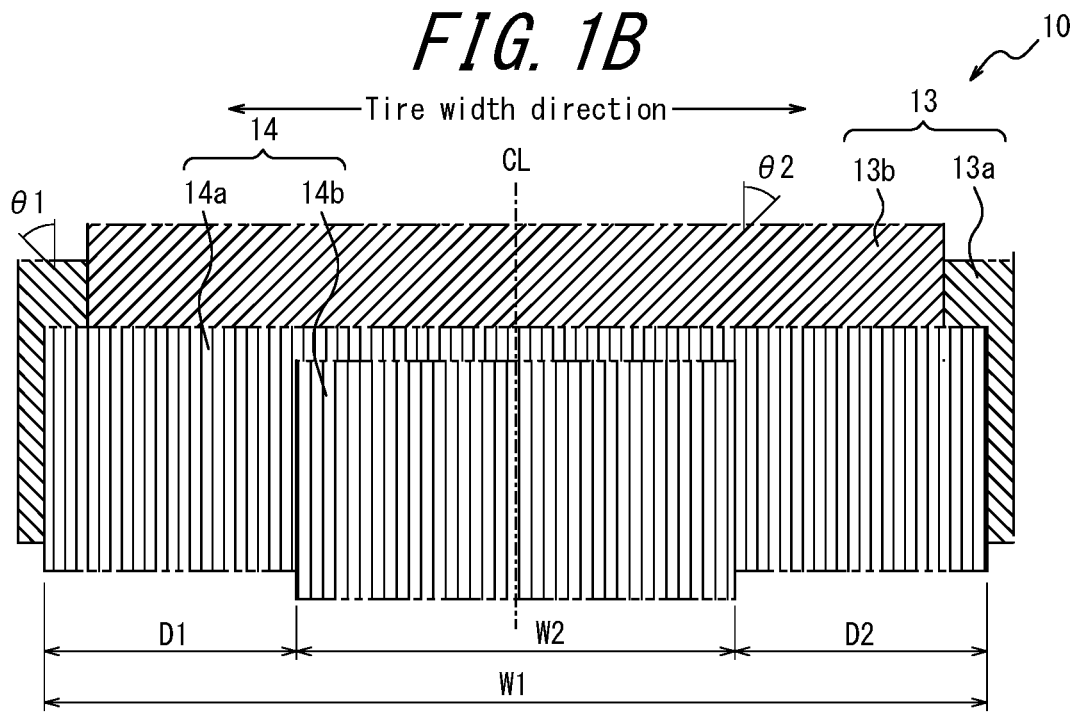
FIG. 1B is a plan view of the layer structure in the tread portion of FIG. 1A.

As illustrated in FIGS. 1A and 1B, a pneumatic tire 10 according to a first embodiment of the present disclosure (hereinafter, also referred to simply as the "tire") comprises a carcass 12 toroidally extending between a pair of bead portions 11, an inclined belt layer 13 which is arranged outward in the tire radial direction of a crown portion of the carcass 12, a circumferential cord layer 14, and a tread 15 arranged outward in the tire radial direction of the inclined belt layer 13. The pneumatic tire 10 is used by mounting on a motor vehicle, and is particularly suitable as the pneumatic tire for passenger vehicles.

Note that, the circumferential cord layer 14 is arranged inward in the tire radial direction of the tread 15, and may be arranged outward in the tire radial direction relative to the inclined belt layer 13, or inward in the tire radial direction relative to the inclined belt layer 13.

The inclined belt layer 13 has a cord extending inclined relative to the tire circumferential direction, and comprises at least one layer arranged through a tire equator CL; in the present embodiment, only two layers of a wide-width inclined belt layer 13a having a relatively wide width in the tire width direction and a narrow-width inclined belt layer 13b having a relatively narrow width in the tire width direction which form an intersecting layer. Herein, it is preferable that at least the tire width direction center of the wide-width inclined belt layer 13a coincides with the tire equator CL, in the present embodiment, the tire width direction centers of the wide-width inclined belt layer 13a and the narrow-width inclined belt layer 13b coincide with the tire equator CL.

The width of a maximum width inclined belt layer (in the present embodiment, the wide-width inclined belt layer 13a) which has the widest width in the inclined belt layer 13 is set to 90% to 115% of the width in the tire width direction (tread width) of the tread 15, preferably 100% to 105% (in the present embodiment, 105%).

The inclination angle of the cords of the inclined belt layer 13 with respect to the tire circumferential direction is from 30° to 90°, preferably from 50° to 75°. If the inclination angle of the cords of the inclined belt layer 13 with respect to the tire circumferential direction is less than 30°, the rigidity with respect to the tire width direction decreases, thus, the steering stability especially upon cornering cannot be adequately obtained, and shearing deformation of the rubber between layers increases, and accordingly, the rolling resistance performance deteriorates. Further, the steering stability and the rolling resistance performance can be maintained at a high level by setting the inclination angle of the cords of the inclined belt layer 13 with respect to the tire circumferential direction to 50° or more.

A metal cord and in particular, a steel cord can be used as the material of the cord of the inclined belt layer 13, but it is also possible to use an organic fiber cord (in the present embodiment, a steel cord). The steel cord may include steel as a main component, and can also contain various micro inclusions such as carbon, manganese, silicon, phosphorous, sulfur, copper, and chromium. Further, a monofilament cord and cords obtained by twisting a plurality of filaments can be used, and various designs may be adopted for the twist structure, which may be different in, for example, sectional structure, twist pitch, twist direction, and/or distance of adjacent filaments. Furthermore, cords obtained by twisting filaments of different materials may also be used, which may employ various twist structures such as single twist, layer twist, and multi twist without being limited to any particular sectional structure.

The number of cords implanted is, for example, set to a range of 20 to 60 cords/50 mm, but it is not limited to this range. Further, the wide-width inclined belt layer 13a and the narrow-width inclined belt layer 13b may have the same or a different number of such cords.

The circumferential cord layer 14 has a cord extending along the tire circumferential direction, and at least one layer; in the present embodiment, the two layers of the wide-width circumferential cord 14a having a relatively wide width in the tire width direction and the narrow-width circumferential cord layer 14b having a relatively narrow width in the tire width direction, is arranged outward in the tire radial direction relative to the inclined belt layer 13. Herein, at least, it is preferable that the tire width direction center of the wide-width circumferential cord layer 14a be coincident with the tire equator CL, and in the present embodiment, the tire width direction centers of the wide-width circumferential cord layer 14a and the narrow-width circumferential cord layer 14b coincide with the tire equator CL. Therefore, in the present embodiment, the inclined belt layer 13 (in the present embodiment, the wide-width inclined belt layer 13a and the narrow-width inclined belt layer 13b) and the circumferential cord layer 14 (in the present embodiment, the wide-width circumferential cord layer 14a and the narrow-width circumferential cord layer 14b) are arranged symmetrically in a pair of tire halves which sandwich the tire equator CL in the tire width direction.

In the present embodiment, the narrow-width circumferential cord layer 14b has a width in the tire width direction which is about 0.5 times the width in the tire width direction of the wide-width circumferential cord layer 14a which is the maximum width in the tire width direction of the circumferential cord layer 14, and the wide-width circumferential cord layer 14a and the narrow-width circumferential cord layer 14b both have their tire width direction centers arranged on the tire equator CL (refer to FIGS. 1 A and 1B). Therefore, the circumferential cord layer 14 has a center region which is the center portion of the width in the tire width direction which includes at least the tire equator CL as a two layer structure of the wide-width circumferential cord layer 14a and the narrow-width circumferential cord layer 14b, and makes the rigidity in the tire circumferential direction of any portion of the center region higher than the rigidity in the tire circumferential direction of any portion of both shoulder regions adjacent to the center region.

Namely, the circumferential cord layer 14 has a high-rigidity region (in the present embodiment, the region in which the wide-width circumferential cord layer 14a overlaps with the narrow-width circumferential cord layer 14b) which is a region including the tire equator CL and in which the rigidity in the tire circumferential direction per unit width in the tire width direction is high, and a low-rigidity region which is a region on each side in the tire width direction of the high-rigidity region and in which the rigidity in the tire circumferential direction per unit width in the tire width direction is low (in the present embodiment, the region of only the wide-width circumferential cord layer 14a and in which the wide-width circumferential cord layer 14a and the narrow-width circumferential cord layer 14b do not overlap with each other).

This high-rigidity region, other than forming by increasing the number (number of layers) of circumferential cord layers 14 relative to the low-rigidity region, can also be formed by changing the type of cords in the high-rigidity region and the low-rigidity region, but it is preferable to form the entire circumferential cord layer 14 as the same member by increasing the number of circumferential cord layers 14 in the high-rigidity region relative to the number of circumferential cord layers 14 in the low-rigidity region.

Even among tires for passenger vehicles, in a tire having a large inclination angle (for example, 30° or more) of the cord of the inclined belt layer with respect to the tire circumferential direction, in a high frequency region of 400 Hz to 2 kHz, the tread surface tends to have a shape that largely vibrates uniformly in primary, secondary, tertiary, etc., vibration modes in a sectional direction, and thus, a large noise emission is generated. Therefore, locally increasing the rigidity in the circumferential direction of the width direction central portion of the tread, makes the width direction central portion of the tread less likely to expand in the tire radial direction, and thus, the noise emission is reduced.

The circumferential cord layer 14 preferably has a high rigidity, and more specifically, comprises a rubberized layer of cords extending in the tire circumferential direction, and preferably satisfies $1500 \geq X \geq 750$ where X is defined as $X = Y \times n \times m \times d$, Y is the Young's modulus (GPa) of the cords, n is the number of cords implanted (cords/50 mm), in is the number of circumferential cord layers 14, and d is the cord diameter (mm).

Note that, the cord diameter d is preferably 0.5 to 1.2 mm.

In the present embodiment, the tire width direction end of the circumferential cord layer 14 is preferably arranged on the outer side in the tire width direction relative to the tire width direction end of the narrow-width inclined belt layer 13b, and, on the inner side in the tire width direction relative to the tire width direction end of the wide-width inclined belt layer 13a.

Further, wavy-shaped cords may be used in the circumferential cord layer 14 in order to increase the rupture strength. A high-elongation cord (for example, with an elongation at break of 4.5% to 5.5%) may be used to increase the rupture strength in the same manner. Various materials which may be adopted as the cord material, and typical examples include rayon, nylon, polyethylene naphthalate (PEN), polyethylene terephthalate (PET), aramid, glass fiber, carbon fiber, and steel. In terms of weight reduction, an organic fiber cord is particularly preferable.

The cord can use monofilament cords, cords obtained by twisting a plurality of filaments, or hybrid cords obtained by twisting filaments of different materials. The number of cords implanted is set to a range of 20 to 60 cords/50 mm, but it is not limited to this range.

The circumferential cord layer 14 can be designed to have a wider or narrower width in the tire width direction than the inclined belt 13, and for example, the width can be set to 90 to 110% of the maximum width inclined belt layer (in the present embodiment, the wide-width inclined belt layer 13a) having the largest width in the tire width direction in the inclined belt 13.

Further, from the production standpoint, it is particularly advantageous to configure the circumferential cord layer 14 as a spiral layer, but the layer may be formed by spirally winding a striped cord in which a plurality of core wires arranged in parallel with each other on a plane are bundled together by a wrapping wire with the parallel arrangement being maintained.

The tread 15 is set so that the high-rigidity region (in the present embodiment, the region in which the wide-width circumferential cord layer 14a overlaps with the narrow-width circumferential cord layer 14b) of the circumferential cord layer 14 has a higher negative ratio in the ground contact width of the tread than the low-rigidity region (in the present embodiment, the region of only the wide-width circumferential cord layer 14a) of the circumferential cord layer 14. The rigidity balance of the tread surface can be maintained thereby, thus, the deterioration of the uneven wear performance due to the deterioration of the ground contact area can be suppressed.

The pattern of the tread 15 may be either of a pattern symmetrical in the tire width direction about the tire equator CL or an asymmetric pattern. The negative ratio of the pattern can be set to, for example, 30% or less. When a circumferential main groove is provided in the tread 15, 2 to 4 grooves are preferable, and the groove width of the circumferential main groove is preferably in the range of about 4 to 10 mm. Note that, there does not have to be a circumferential main groove, and it may be a rib-like land portion or a block-like land portion.

The tread rubber which configures the tread 15 may be formed by a CAP/BASE structure, having a plurality of different types of rubber layers in the tire radial direction. The plurality of rubber layers may be different in tangent loss, modulus, hardness, glass transition temperature, material, or the like. Further, the ratio of the thickness in the tire width direction of the plurality of rubber layers may vary in the tire width direction. Moreover, for example, a rubber layer different from its surroundings may be provided only at the circumferential main groove bottom.

Further, the tread rubber may be formed of a divided tread structure consisting of a plurality of different types of rubber layers in the tire width direction. The plurality of rubber layers may be different in tangent loss, modulus, hardness, glass transition temperature, material, or the like. Further, the ratio of the length in the tire width direction of the plurality of rubber layers in the tire width direction may vary in the tire radial direction. Further, a rubber layer different from its surroundings may be provided only in a limited region such as near the circumferential main groove, near the tread edge, on the shoulder land portion, or on the center land portion.

In the pneumatic tire 10 according to the present disclosure, various structures in the pneumatic tire can be adopted in a carcass line which is an extended ring portion of the carcass 12 in the tire widthwise section, for example, the maximum width position of the carcass in the tire radial direction may be close to the bead portion side or may be close to the tread side. As an example, the maximum width position of the carcass may be in a range of 50% to 90%, in a tire height ratio, on the outer side in the tire radial direction from the bead base portion. The number of cords of the carcass implanted can also adopt various structures in the pneumatic tire, and for example, is preferably 20 to 60 cords/50 mm, but it is not limited to this range. Further, the cord arrangement in the carcass may be a bias structure or may be a radial structure (in the present embodiment, a radial structure is adopted).

A carcass folded-up portion in which the carcass 12 folds up the bead core of the bead portion 11 can also adopt various structures in the pneumatic tire, for example, a folded-up end of the carcass 12 can be arranged inward in the tire radial direction relative to the bead filler end, and further, the carcass folded-up end can be stretched to the outer side in the tire radial direction relative to the bead filler end and the tire maximum width position, and can be stretched, in some cases, to the inner side in the tire width direction relative to the tire width direction end of the belt layer. Furthermore, when the carcass 12 is comprised of a plurality of carcass layers, the tire radial direction positions of the carcass folded-up ends can be different. Further, the carcass folded-up portion may not be present in the first place, and instead, the carcass may adopt a structure sandwiched between a plurality of bead core members or wound around the bead core.

In the tire side portion, the tire maximum width position may be in a range of 50% to 90%, in a tire height ratio, on the outer side in the tire radial direction from the bead base portion, Further, it can also be a structure having a rim guard.

Further, it can also be a structure without the bead filler.

The bead core can adopt various structures in the pneumatic tire such as a circular shape and a polygonal shape, and further, as stated above, other than the structure in which the carcass is wound around the bead core, a structure in which the bead core is divided so as to sandwich the carcass by a plurality of bead core members is possible. Further, in order to reinforce the bead core surroundings, a rubber layer, a cord layer and the like can be provided in the bead portion for the purpose of reinforcement. Such additional members can be provided in various positions relative to the carcass and the bead filler.

The air permeation coefficient of the rubber composition constituting an inner liner arranged on the tire inner surface is preferably set to $1.0 \times 10^{-14}$ cc·cm/(cm$^2$·s·cm Hg) to $6.5 \times 10^{-10}$ cc·cm/(cm$^2$·s·cm Hg). For example, it is preferable that the inner liner is a rubber layer mainly made of butyl rubber (in the present embodiment, butyl rubber). Note that, in addition to the rubber layer mainly made of butyl rubber, the inner liner may be formed with a film layer mainly made of resin.

Further, the tire inner surface may be provided with a porous member (a sponge or the like), or subjected to electrostatic flocking processing, for reducing cavity resonance noise, or provided with a sealant member for preventing air leakage upon puncture.

Further, the pneumatic tire may be a side-reinforced run-flat tire including a reinforcing rubber having a crescent-shaped cross section in the tire side portion.

In the pneumatic tire 10, the circumferential cord layer 14 may be arranged asymmetrically relative to the tire equator CL.

Figure 2:
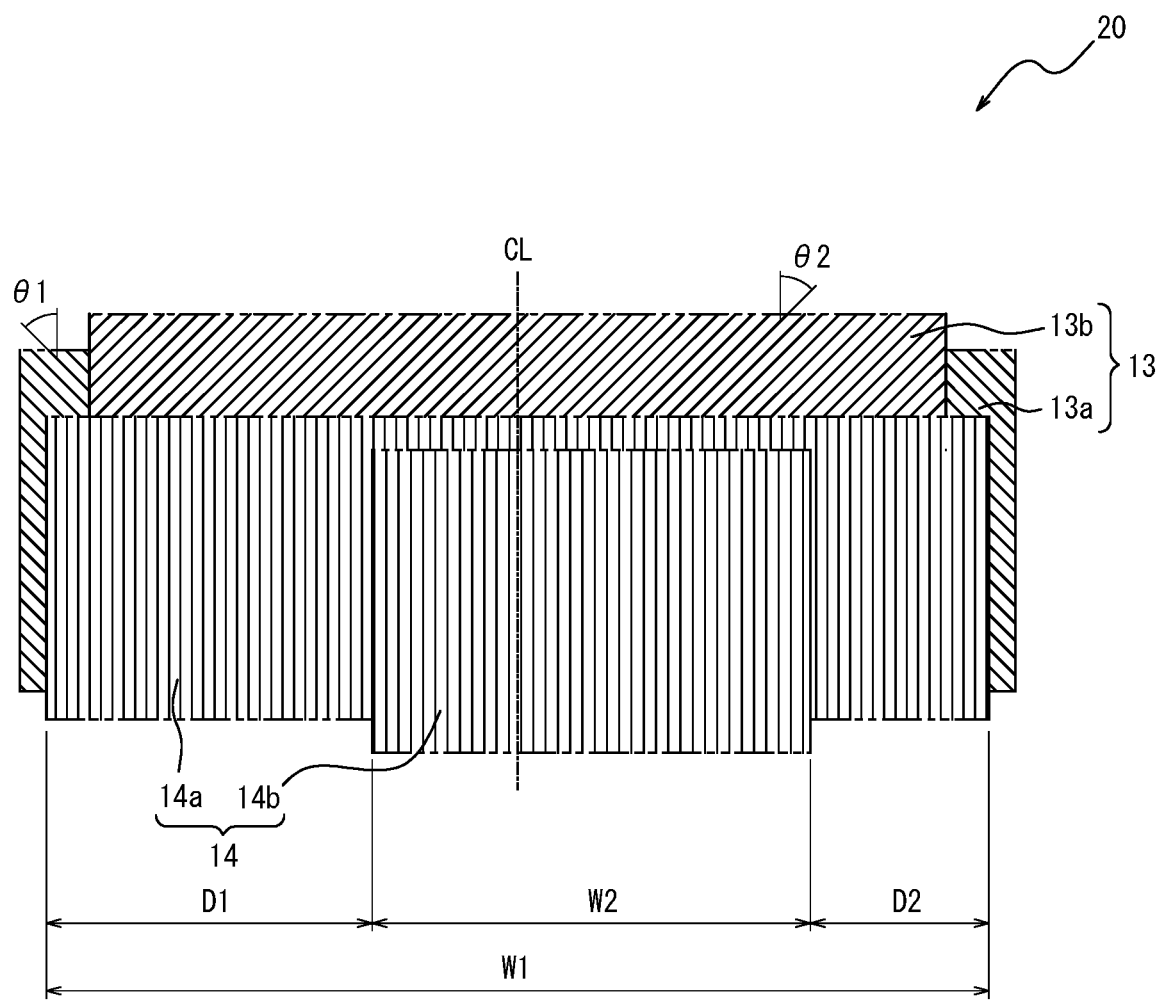
FIG. 2 is a schematic view of another example of the pneumatic tire of FIG. 1, and is a plan view of the layer structure in the tread portion.

As illustrated in FIG. 2, in the present embodiment, the pneumatic tire 20, in addition to the circumferential cord layer 14 being asymmetrically arranged relative to the tire equator CL, has the same structure and operation as the pneumatic tire 10 according to the aforementioned first embodiment.

In the pneumatic tire 20, the wide-width circumferential cord layer 14a and the narrow-width circumferential cord layer 14b are formed so that when W1 denotes the width in the tire width direction (in the present embodiment, the width in the tire width direction of the wide-width circumferential cord layer 14a) of the entire circumferential cord layer 14, W2 denotes the width in the tire width direction (in the present embodiment, the width in the tire width direction of the narrow-width circumferential cord layer 14b) of the high-rigidity region (in the present embodiment, the region in which the wide-width circumferential cord layer 14a overlaps with the narrow-width circumferential cord layer 14b), and D1 and D2 respectively denote the longer and the shorter among the distances in the tire width direction from each end in the tire width direction of the entire circumferential cord layer 14 to each end in the tire width direction of the high-rigidity region on a side close to each end in the tire width direction of the circumferential cord layer 14 (in the present embodiment, the narrow-width circumferential cord layer 14b), $W2/W1=0.2$ to 0.7, and, $D1/D2=2.0$ to 8.0 are satisfied.

Namely, in the pneumatic tire 20, the center region (in the present embodiment, the region in which the wide-width circumferential cord layer 14a overlaps with the narrow-width circumferential cord layer 14b) of the circumferential cord layer 14 which is the high-rigidity region is extended over a range from 0.2 times to 0.7 times the maximum width W in the tire width direction of the circumferential cord layer 14, and furthermore, comprises a structure in which the widths D1 and D2 in tire width direction of each shoulder region (in the present embodiment, the region of only the wide-width circumferential cord layer 14a) which is the low-rigidity region of the circumferential cord layer 14 are different where the ratio D1/D2 is in a range from 2.0 to 8.0, that is, the circumferential cord layer 14 is arranged asymmetrically with respect to the tire equator CL as seen in the tire widthwise section (in the present embodiment, shifted rightward in the drawing (refer to FIG. 2)). Therefore, not only is the amplitude of the vibration mode which causes the noise emission suppressed, but the vibration mode is separated into two vibration modes. As a result, the peak level of the sound is reduced more effectively, thus, it is possible to further reduce the noise emission generated from the tire.

In this way, the noise emission generated from the tire can be reduced in the pneumatic tire 20 in which the peak level of sound is reduced by decreasing the amplitude of the vibration generated in the tire and separating the amplitude into different modes regardless of other tire configurations, for example, the size of the cord angle of the inclined belt layer.

Third Embodiment

Figure 3A:
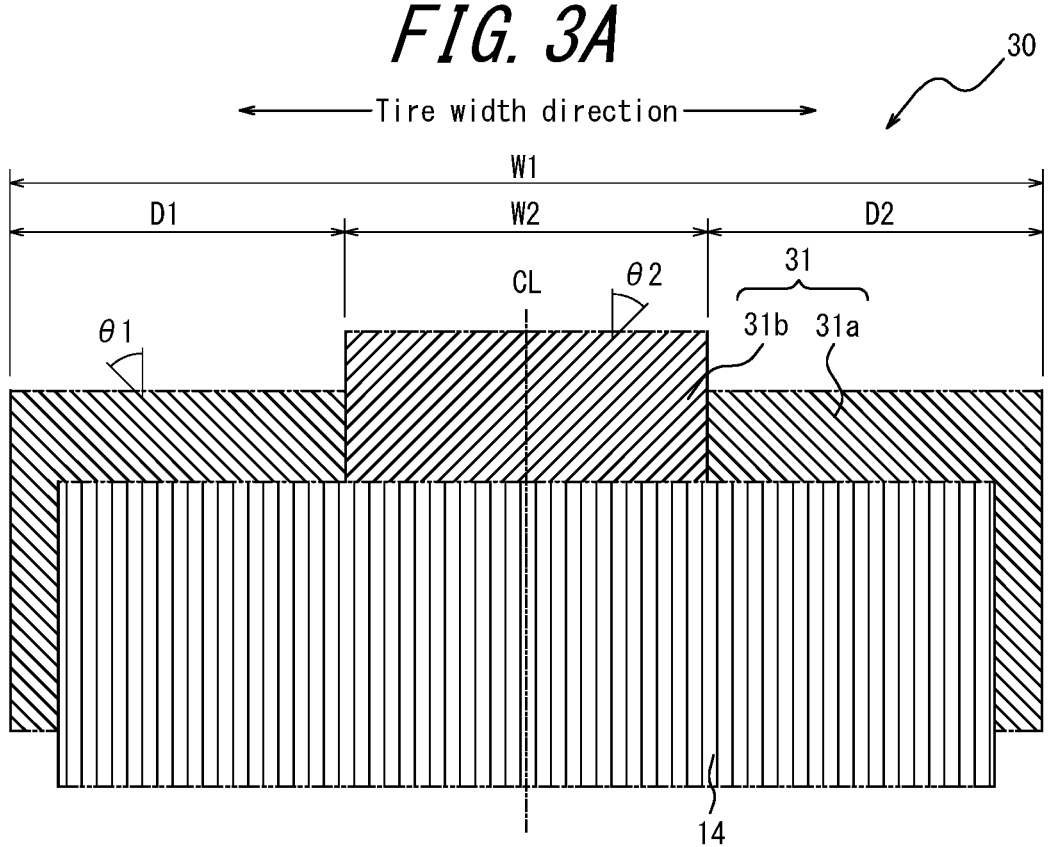
FIG. 3A is a schematic view of a pneumatic tire according to a second embodiment of the present disclosure, and is a plan view of the layer structure in the tread portion.

A pneumatic tire 30 according to a third embodiment of the present disclosure comprises, as illustrated in FIG. 3A, an inclined belt layer 31 including at least a wide-width inclined belt layer 31a having a relatively wide width in the tire width direction and a narrow-width inclined belt layer 31b having a relatively narrow width in the tire width direction, both passing through the tire equator CL, and when the inclination angle with respect to the tire circumferential direction of the cord of the wide-width inclined belt layer 31a is θ1, and the inclination angle with respect to the tire circumferential direction of the cord of the narrow-width inclined belt layer 31b is θ2, 30°≤θ1≤85°, 10°≤θ2≤30°, and θ1>θ2 are satisfied. The other structures and operations are the same as the pneumatic tire 10 according to the aforementioned first embodiment.

In the present embodiment, the narrow-width inclined belt layer 31b of the pneumatic tire 30 has a width in the tire width direction which is about 0.5 times the width in the tire width direction of the wide-width inclined belt layer 31a which is the tire width direction maximum width of the inclined belt layer 31, and the wide-width inclined belt layer 31a and the narrow-width inclined belt layer 31b both have their tire width direction centers arranged at the tire equator CL (refer to FIG. 3A). Therefore, the inclined belt layer 31 has a center region which is the center portion of the width in the tire width direction which includes at least the tire equator CL as a two layer structure of the wide-width inclined belt layer 31a and the narrow-width inclined belt layer 31b, and makes the rigidity in the tire circumferential direction of any portion of the center region higher than the rigidity in the tire circumferential direction of any portion of both shoulder regions adjacent to the center region.

If the inclination angle θ1 with respect to the tire circumferential direction of the cord forming the wide-width inclined belt layer 31a is 30° or more, the circumferential elongation of rubber increases as the surface of the tread 15 deforms, thus, the ground contact length of the tire is sufficiently maintained. As a result, the cornering power can increase to achieve a high turning performance. Note that, if the inclination angle θ1 exceeds 85°, there is the risk that the circumferential bending rigidity may become excessively small, thus, the inclination angle θ1 is set to 85° or less.

However, when the inclination angle θ1 of the cord of the inclined belt layer 31a having the widest width is made too large, the vibration mode of the tire changes, and accordingly, a noise emission is generated, and the noise performance tends to deteriorate. In more detail, in a high frequency region of 400 Hz to 2 kHz, the tread surface of many tires having the cord of the inclined belt layer inclined at about 30° to 85° with respect to the tire circumferential direction have a shape that largely vibrates uniformly in primary, secondary, tertiary, etc. vibration modes in a sectional direction, and thus, there is the fear that a large noise emission is generated.

Therefore, if the inclination angle θ2 of the cord of the narrow-width inclined belt layer 31b relative to the tire circumferential direction is set to be smaller than the inclination angle θ1 of the cord of the wide-width inclined belt layer 31a, and is in the range of 10° to 30°, the out-of-plane bending stiffness in the tire circumferential direction is appropriately maintained in the vicinity of the tire equator CL, thus, the vibration of the tread surface can be suppressed in the aforementioned vibration modes. That is, the expansion of the tread 15 in the tire circumferential direction in the vicinity of the tire equator CL is suppressed, and as a result, such noise emission can be further decreased.

By the inclination angle θ2 being set to 10° or more, the out-of-plane bending stiffness in the tire circumferential direction can be maintained in the wide-width inclined belt layer 31a without inhibiting the operation for maintaining the ground contact length, and by setting the inclination angle θ2 to 30° or less, the out-of-plane bending stiffness of the tire circumferential direction is appropriately maintained in the vicinity of the tire equator CL, thus, the generation of noise emission can be more reliably decreased.

In addition, the pneumatic tire 30 of the present embodiment is configured so that the high-rigidity region (in the present embodiment, the region in which the wide-width inclined belt layer 31a and the narrow-width inclined belt layer 31b overlap with each other) of the inclined belt layer 31 has a higher negative ratio in the ground contact width of the tread 15 than the low-rigidity region (in the present embodiment, the region of only the wide-width inclined belt layer 31a) of the inclined belt layer 31. As a result, the dampening of the vibration mode is further improved and the noise performance can be further improved.

In the pneumatic tire 30, the inclined belt layer 31 may be arranged asymmetrically relative to the tire equator CL.

Figure 3B:
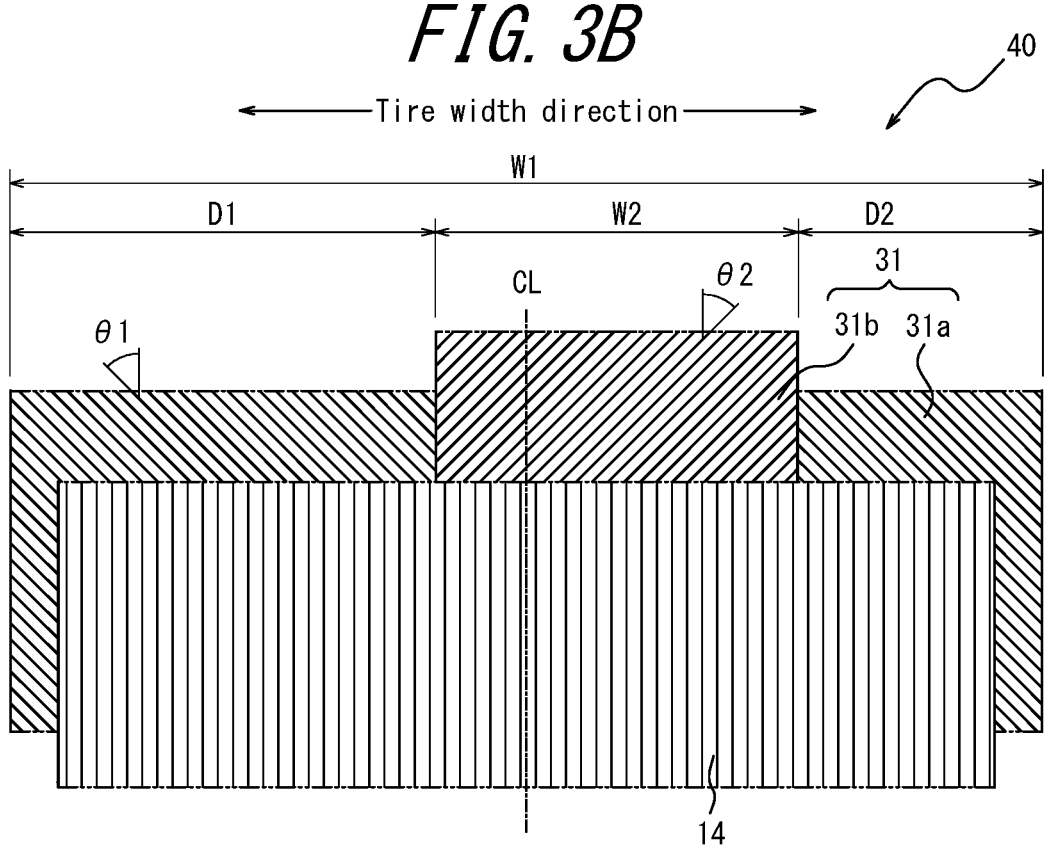
FIG. 3B is a plan view similar to FIG. 3A illustrating another example of the pneumatic tire.

As illustrated in FIG. 3B, in the present embodiment, the pneumatic tire 40, other than the inclined belt layer 31 being arranged asymmetrically with respect to the tire equator CL, has the same structure and operation as the aforementioned pneumatic tire 30.

In the pneumatic tire 40, the wide-width inclined belt layer 31a and the narrow-width inclined belt layer 31b are formed so that when W1 denotes the width in the tire width direction of a widest-width inclined belt layer having the widest width in the tire width direction in the inclined belt layer 31 (in the present embodiment, the width in the tire width direction of the wide-width inclined belt layer 31a), W2 denotes the width in the tire width direction of a narrowest-width inclined belt layer having the narrowest width in the tire width direction in the inclined belt layer 31 (in the present embodiment, the width in the tire width direction of the narrow-width inclined belt layer 31b), and D1 and D2 respectively denote the longer and the shorter among the distances in the tire width direction from each end in the tire width direction of the entire inclined belt layer 31 to each end in the tire width direction of the narrowest-width inclined belt layer (in the present embodiment, the narrow-width inclined belt layer 31b) on a side close to each end in the tire width direction of the widest-width inclined belt layer (in the present embodiment, the wide-width inclined belt layer 31a), $W2/W1=0.2$ to $0.7$, and, $D1/D2=2.0$ to $8.0$ are satisfied.

Namely, in the pneumatic tire 40, the center region (in the present embodiment, the region in which the wide-width inclined belt layer 31a and the narrow-width inclined belt layer 31b overlap with each other) of the inclined belt layer 31 which is the high-rigidity region is extended over a range from 0.2 times to 0.7 times the maximum width W in the tire width direction of the inclined belt layer 31, and furthermore, comprises a structure in which the widths D1 and D2 in the tire width direction of each shoulder region (in the present embodiment, the region of only the wide-width inclined belt layer 31a) which is the low-rigidity region of the inclined belt layer 31 are different where the ratio D1/D2 is in a range from 2.0 to 8.0, that is, the inclined belt layer 31 is arranged asymmetrically with respect to the tire equator CL as seen in the tire widthwise section (in the present embodiment, shifted rightward in the drawing (refer to FIG. 3B)). Therefore, not only is the amplitude of the vibration mode which causes the noise emission suppressed, but the vibration mode is separated into two vibration modes. As a result, the peak level of the sound is reduced more effectively, thus, it is possible to further reduce the noise emission generated from the tire.

In this way, the noise emission generated from the tire can be reduced in the pneumatic tire 10 in which the peak level of sound is reduced by decreasing the amplitude of the vibration generated in the tire and separating the amplitude into different modes regardless of other tire configurations, for example, the size of the cord angle of the inclined belt layer.

In the present disclosure, when the tire internal pressure is set to 250 kPa or more, the sectional width SW and the outer diameter OD of the tire preferably satisfy the relational expression: $OD \geq -0.0187 \times SW^2 + 9.15 \times SW - 380$. The reason is that the drag coefficient (Cd value) and the rolling resistance value (RR value) can be reduced to improve the fuel efficiency. Further, the tire is preferably used as a passenger vehicle pneumatic radial tire.

REFERENCE SIGNS LIST 10, 20, 30, 40 . . . pneumatic tire,
11 . . . bead portion,
12 . . . carcass,
13, 31 . . . inclined belt layer,
13a, 31a . . . wide-width inclined belt layer,
13b, 31b, . . . narrow-width inclined belt layer,
14 . . . circumferential cord layer,
14a, 31a . . . wide-width circumferential cord layer,
14b, 31b . . . narrow-width circumferential cord layer,
15 . . . tread,
CL . . . tire equator

The invention claimed is:

1. A pneumatic tire comprising:
a carcass toroidally extending between a pair of bead portions, at least one inclined belt layer arranged outward in a tire radial direction of a crown portion of the carcass and having a cord extending inclined relative to a tire circumferential direction, and a tread arranged outward in the tire radial direction of the inclined belt layer,
one or more circumferential grooves, and
at least one circumferential cord layer having a cord extending along the tire circumferential direction is arranged inward in the tire radial direction of the tread, wherein
the inclined belt layer includes at least a wide-width inclined belt layer having a relatively wide width in the tire width direction and a narrow-width inclined belt layer having a relatively narrow width in the tire width direction, both passing through the tire equator, and when an inclination angle relative to the tire circumferential direction of the cord of the wide-width inclined belt layer is θ1 and an inclination angle relative to the tire circumferential direction of the cord of the narrow-width inclined belt layer is θ2, 30°≤θ1≤85°, 10°≤θ2≤30°, and, θ1 ≥θ2 are satisfied, the inclined belt layer has a high-rigidity region which is a region including the tire equator and in which the rigidity in the tire circumferential direction per unit width in the tire width direction is high, and a low-rigidity region which is a region on each side in the tire width direction of the high-rigidity region and in which the rigidity in the tire circumferential direction per unit width in the tire width direction is low, the high-rigidity region has a higher negative ratio in a ground contact width of the tread than the low-rigidity region; and a groove width of a circumferential groove, which has a maximum groove width from among all of the one or more circumferential grooves, is 4 to 10 mm;

wherein when W1 denotes a width in the tire width direction of a widest-width inclined belt layer having the widest width in the tire width direction in the inclined belt layer, W2 denotes a width in the tire width direction of a narrowest-width inclined belt layer having the narrowest width in the tire width direction in the inclined belt layer, and D1 and D2 respectively denote the longer and the shorter among the distances in the tire width direction from each end in the tire width direction of the widest-width inclined belt layer to each end in the tire width direction of the narrowest-width inclined belt layer on a side close to each end in the tire width direction of the widest-width inclined belt layer, W2/W1=0.2 to 0.7, and, D1/D2=2.0 to 8.0 are satisfied.

2. The pneumatic tire according to claim 1, wherein a pattern of the tread has a negative ratio of a pattern of 30% or less, the one or more circumferential grooves comprise 2 to 4 circumferential main grooves, and a groove width of each of the circumferential grooves is in the range of 4 to 10 mm.

3. The pneumatic tire according to claim 1, wherein a number of cords of the carcass is 20 to 60 cords/50 mm.

4. The pneumatic tire according to claim 1, wherein further comprising an inner liner arranged on a tire inner surface, wherein an air permeation coefficient of a rubber composition constituting the inner liner arranged on the tire inner surface is set to 1.0×10-14 cc·cm/(cm2 ·s·cm Hg) to 6.5×10-10 cc·cm/(cm2 ·s·cm Hg).

* * * * *